US007861508B2

(12) United States Patent
Murayama et al.

(10) Patent No.: US 7,861,508 B2
(45) Date of Patent: Jan. 4, 2011

(54) CABLE SUPPORTING DEVICE

(75) Inventors: Shigeki Murayama, Yokkaichi (JP);
Yoshinao Kobayashi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 332 days.

(21) Appl. No.: 12/083,316

(22) PCT Filed: Jul. 11, 2006

(86) PCT No.: PCT/JP2006/313737

§ 371 (c)(1),
(2), (4) Date: Apr. 9, 2008

(87) PCT Pub. No.: WO2007/043225

PCT Pub. Date: Apr. 19, 2007

(65) Prior Publication Data

US 2009/0121093 A1 May 14, 2009

(30) Foreign Application Priority Data

Oct. 14, 2005 (JP) .............................. 2005-300613

(51) Int. Cl.
*F16C 11/00* (2006.01)
*F16G 13/00* (2006.01)
(52) U.S. Cl. .................... 59/78.1; 114/364; 403/122
(58) Field of Classification Search ............... 59/78.1; 248/49, 51; 114/253, 364; 403/122, 127
See application file for complete search history.

(56) References Cited

U.S. PATENT DOCUMENTS

| 3,215,405 | A | * | 11/1965 | Walsh | .......................... 254/389 |
|---|---|---|---|---|---|
| 6,213,674 | B1 | | 4/2001 | Sasaki et al. | |
| 6,996,967 | B2 | | 2/2006 | Kobayashi | |
| 7,284,785 | B2 | * | 10/2007 | Gotou et al. | ................. 296/155 |
| 7,302,907 | B2 | * | 12/2007 | Carlton | ........................ 114/364 |
| 7,385,136 | B2 | * | 6/2008 | Ogawa et al. | ................. 59/78.1 |
| 2007/0025061 | A1 | | 2/2007 | Kogure et al. | |

FOREIGN PATENT DOCUMENTS

| JP | 2002-112444 | 4/2002 |
|---|---|---|
| JP | 2002127847 | 5/2002 |
| JP | 2005-00810 | 1/2005 |

* cited by examiner

*Primary Examiner*—David B Jones
(74) *Attorney, Agent, or Firm*—Gerald E. Hespos; Michael J. Porco

(57) ABSTRACT

A device for supporting a cable between a vehicle body and a movable member movably connected to the vehicle body is provided with a guide member including a first opening communicating with a hollow portion of a frame body and used for the insertion of the cable, a second opening spaced apart by a specified angle from the first opening, communicating with the hollow portion and used for the insertion of the cable, and a three-dimensional arcuate surface on the outer surface of the frame body; and a supporting member for rotatably holding the arcuate surface of the guide member. The supporting member is fixed to the vehicle body and/or movable member. The cable is inserted from the first opening of the guide member to the second opening through the hollow portion, so that the guide member can follow angular changes of the cable in vertical, transverse and oblique directions.

8 Claims, 7 Drawing Sheets

CABLE SUPPORTING DEVICE

BACKGROUND OF THE INVENTION

1. Field of the Invention

The present invention relates to a cable supporting device and is particularly designed to support a cable spanning between a slide door of a vehicle and a vehicle body in such a manner as to be able to follow the cable when the cable changes its angle in vertical, transverse and oblique directions as the slide door is opened and closed.

2. Description of the Related Art

Electrical parts such as a power window and a door lock are installed in a door of an automotive vehicle, and a cable (door harness) for constantly feeding power is connected with these electrical parts. The cable is arranged to extend toward the vehicle body and connected with a power-supply side cable in the vehicle body.

If the door is a slide door, it may move in vertical direction normal to a sliding direction and transverse direction at the time of being closed and opened. Thus, the angle of the cable spanning between the slide door and the vehicle body changes with respect to transverse and vertical directions.

The cable spanning between the slide door and the vehicle body is fixed to and supported on the vehicle body, but it is necessary to provide a mechanism capable of following the angular change of the cable in vertical, transverse and oblique directions in the supporting device.

U.S. Pat. No. 6,996,967 proposes a device shown in FIG. 7 as a cable supporting device of this type. In this device, a cable spanning between a vehicle body and a slide door is covered by a cable guide 2 formed by connecting a plurality of link members 1, one end of the cable guide 2 is connected with a supporting member 3 fixed to the vehicle body and the cable inserted through the cable guide 2 is passed through the supporting member 3.

The supporting member 3 and the link member 1a at the leading end of the cable guide 2 are rotatably connected via a connection pin P1 extending in horizontal direction, so that the link member 1a is swingably connected with the supporting member 3 in vertical direction so as to follow the angular change of the cable in vertical direction. On the other hand, the adjacent link members 1 of the cable guide 2 are connected rotatably in transverse direction by connection pins P2 extending in vertical direction so as to be able to follow the angular change of the cable in transverse direction.

Specifically, by setting the mounting direction of the pins P2 connecting the link members 1 of the cable guide 2 and that of the pin P1 connecting the link member 1a of the cable guide 2 at the leading end of the cable guide and the supporting member 3 orthogonal to each other, a mechanism can follow the angular change of the cable in vertical and transverse directions.

In the cable supporting device of U.S. Pat. No. 6,996,967, an amount of vertical displacement is restricted to a vertical angular range in which the link member 1a at the leading end of the cable guide 2 can rotate about the pin P1 and an amount of transverse displacement is restricted to a transverse angular range in which the link members 1 of the cable guide 2 can rotate about the pins P2. Further, the construction of U.S. Pat. No. 6,996,967 cannot cope with inclining movements in oblique directions.

An amount of vertical angular change of a slide door of an automotive vehicle differs depending on the vehicle type. Further, the slide door is constructed to obliquely move with respect to vertical direction as being slid from a closed state to an open state. This angle of inclination also differs depending on the vehicle type. Further, the mounting position and mounting angle of the cable supporting device on the vehicle also differ.

If the vertical rotational angular range is restricted as in patent document 1, it takes time to consider the mounting position and mounting angle of the cable supporting device for each vehicle type. If the vertical displacement of the cable is large or the angle of inclination thereof is large, the cable itself is twisted in the construction of U.S. Pat. No. 6,996,967. However, such a displacement or inclination may not be absorbed in some cases.

In U.S. Pat. No. 6,996,967, the link member 1a at the leading end of the cable guide 2 is swingably connected with the cable supporting member 3 in vertical direction, and the link members 1 successively connected with the vertically swingable link member 1a in forward and backward directions are swingably connected in transverse direction. In other words, the cable passing through the link member 1a at the leading end is swung in vertical direction, but cannot be swung in transverse direction, and a transverse swinging movement is caused by the link member 1 connected with the link member 1a and the following link members 1. Therefore, the cable can make no transverse swinging movement at a position proximate to the cable supporting member 3, thereby being twisted in the link members.

Further, since the connecting direction of the vertically swingable link member 1a at the leading end with the supporting member 3 by the pin and that of the transversely swingable link members by the pins differ in U.S. Pat. No. 6,996,967, all the link members cannot have the same shape and the link member 1a at the leading end needs to be separately provided. This increases the number of parts and, since the link member 1a at the leading end is essential, there is a problem of requiring a larger arrangement space.

The present invention was developed to solve the above problems of U.S. Pat. No. 6,996,967 and an object thereof is to provide a cable supporting device capable of coping with amounts of vertical and transverse angular changes of a cable despite their magnitudes, coping with angular changes of the cable in oblique directions and, hence, sufficiently coping with angular changes of the cable even if the mounting position and mounting angle thereof on a vehicle slightly differ.

SUMMARY OF THE INVENTION

In order to solve the above problems, the invention is directed to a cable supporting device for supporting a cable arranged between a vehicle body and a movable member movably connected to the vehicle body, comprising: a guide member including a first opening formed in one side surface of a frame body, communicating with a hollow portion of a frame body and used for the insertion of the cable, a second opening formed in an upper or lower side of the frame body, communicating with the hollow portion and used for the insertion of the cable, and a three-dimensional arcuate surface on the outer surface of the frame body, and a supporting member for rotatably tightly holding the arcuate surface of the guide member, the supporting member being fixed to the vehicle body and/or movable member, wherein the cable is inserted from the first opening of the guide member to the second opening through the hollow portion, so that the guide member can follow angular changes of the cable in vertical, transverse and oblique directions.

According to the present invention, the cable is supported by being inserted through the hollow portion of the rotatably supported guide member as described above, thereby being able to change its angle over wide ranges in vertical, transverse and oblique directions.

Thus, as compared to a supporting device as disclosed in U.S. Pat. No. 6,996,967 in which the angle of a cable can be changed in vertical direction within a specified angular range only between a supporting member and the link member at the leading end and it can be changed in transverse direction within a specified angular range through the connection of the link members, amounts of angular displacements can be set over wider ranges. Therefore, such amounts of angular displacements are applicable to vehicle types having different directions of displacement and also to vehicle types having different angles of inclination in oblique directions, resulting in good versatility.

Further, since the supporting device of the present invention can cope with any angular changes in vertical, transverse and oblique directions over wide ranges, it is not necessary to consider the mounting position and mounting angle of the supporting device on a vehicle or the like and assemblability at the time of manufacturing can be improved.

Since only the vertical angular change is made and no transverse angular change is made between the supporting member and the link member at the leading end in U.S. Pat. No. 6,996,967, there is a likelihood that the cable is twisted at this position to exert an excessive load on the cable. However, in the supporting device of the present invention, angular changes can be simultaneously made in vertical, transverse and oblique directions, wherefore there is no likelihood of twisting the cable, thereby protecting the cable.

The cable supporting device of the present invention is suitably used in the case of being mounted on the vehicle body and/or a slide door to support the cable arranged between the movable member, which is the slide door, and the vehicle body. In this case, the cable is bent by about 90° upon being arranged in the vehicle body and the door by way of the supporting device from the position of arrangement between the slide door and the vehicle body. Therefore, the first and second openings of the guide member are preferably located at orthogonal positions spaced apart by 90°.

The cable is covered by a corrugate tube between the slide door and the vehicle body in some cases other than by the covering member made of the chained link member disclosed in the prior art. In such a case where the cable is covered by the corrugate tube, the corrugate tube can follow the cable not only in transverse direction, but also in vertical direction, but its angular ranges are limited. Therefore, by supporting the cable covered by the corrugate tube in the vehicle body and/or the slide door using the cable supporting device of the present invention, the supporting device can follow the angular changes of the cable over wider ranges.

In the case of using the corrugate tube instead of the covering member in the form of the chained link member in this way, it is preferable to restrict the bending direction of the corrugate tube to prevent the corrugate tube from coming into contact with an external interfering member, for example, by forming ribs extending in lengthwise direction in a specified section to project at a required position of the outer circumferential surface of the corrugate tube.

More specifically, in the cable supporting device of the present invention: the guide member is a spherical guide member including a spherical frame body and the supporting member includes a first supporting member and a second supporting member having openings for rotatably supporting the outer circumferential surface of the spherical guide member at the opposite sides inside, the first opening of the spherical guide member is formed in one side surface, and a pair of connecting pieces project from the opposite upper and lower edges of the first opening, are caused to project from a spherical opening of the first supporting member and are rotatably connected with a leading-end link of the chained link member covering the cable, so that the leading-end link is connected rotatably in transverse direction and the adjacent links of the chained link member successively connected with the leading-end link are also connected rotatably in transverse direction, whereas the second opening of the spherical guide member is formed at an upper side spaced apart by about 90° from the first opening, and the cable inserted from the first opening is pulled out from the second opening after being bent by about 90° in the hollow portion of the spherical guide member, so that the spherical guide member rotates in vertical, transverse or oblique direction to follow the angular change of the cable in vertical, transverse or oblique direction.

It should be noted that the position of the second opening is not limited to the upper side, and the second opening may be formed at the lower side or in a side surface at a different position from the first opening.

According to the above construction, in the case of using the chained link member as the covering member for the cable, angular changes in vertical direction, which cannot be made by the chained link member, can be made by the rotation of the spherical guide member. Thus, it is not necessary to connect the leading-end link member with the spherical guide member in such a manner as to be vertically swingable, wherefore the leading-end link connected with the supporting member can have the same shape as the other links and may be so connected with the supporting member as to be transversely swingable. As a result, there is no need to provide the leading-end link shaped differently from the other links as in U.S. Pat. No. 6,996,967 and the number of parts can be reduced.

The leading-end link rotates only in directions different from the other links in U.S. Pat. No. 6,996,967, whereas the leading-end link rotates in the same directions as the other links in the case of using the supporting device of the present invention. Thus, an arrangement space can be reduced. Further, since the spherical guide member as the guide member itself rotates in the supporting device of the present invention, the arrangement space can be further reduced if the spherical guide member is rotated in the same direction as the links.

Further, in the cable supporting device of the present invention, the cable is preferably fixed to the second supporting member by providing the second supporting member with a tubular portion communicating with the second opening of the spherical guide member, and providing a fixing piece for the cable projecting from the upper end of the tubular portion.

According to the above construction, since the cable is fixed to the second supporting member, the cable can be prevented from slackening to get entangled or jammed in the spherical guide member, wherefore the spherical guide member can smoothly rotate.

It should be noted that the tubular portion may be provided separately from a tightly holding portion of the spherical guide member and the separate tubular portion may be assembled with the tightly holding portion.

Preferably, a plurality of locking pieces project from the peripheral edge of the spherical opening of either one of the first and second supporting members while being circumferentially spaced apart, whereas locking holes engageable with the locking pieces are formed in the other of the first and second supporting members, and the first and second supporting members are connected with the spherical guide member surrounded and held by the locking pieces.

By having the above construction, the spherical guide member and the first and second supporting members at the opposite sides can be integrally assembled beforehand and fixed to the vehicle body in this state. Thus, assemblability can be improved. Further, by having the above construction, the spherical guide member can be so stably tightly held as to be rotatable by the first and second supporting members.

Preferably, fixing holes are formed at the opposite sides of the spherical opening in each of the first and second supporting members and brought into communication, and fastening members are inserted therethrough to fix the supporting device to the vehicle body and/or the movable member by means of the fastening members.

According to the above construction, the supporting device can be easily fixed to the vehicle body and/or the movable member using the fastening members and the first and second supporting members can be connected with an increased force by such fixation using the fastening members. Therefore, the first and second supporting members can be more firmly connected.

A supporting surface of the supporting member for rotatably supporting the arcuate surface of the guide member is preferably formed with grooves for discharging foreign matters.

In the case of using the supporting device for a cable arranged between a slide door and a vehicle body, dust, sand and water is likely to enter from the outside at an installation location of this supporting device. Thus, there is a high risk that foreign matters such as dust, sand and water deposit on rotational sliding surfaces of the guide member and the supporting member. In such a case, if the grooves for discharging these foreign matters are provided, a possibility that foreign matters are fixed to the rotational sliding surfaces to hinder the rotation of the guide member can be reliably eliminated.

The cable supporting device of the present invention constructed as described above can be optimally used as the one for a cable arranged between a vehicle body and a slide door, and the angular change of the cable can be followed by the rotation of the spherical guide member as the slide door is opened and closed by fixing the supporting member rotatably tightly holding the guide member to the vehicle body and/or the door.

The cable may be a flat cable in which conductive members are arranged in parallel and laminated with an insulating resin sheet or an insulated round wire.

As described above, according to the present invention, the cable is supported by being inserted through the hollow portion of the guide member rotatably supported by the supporting member. Thus, regardless of in which of vertical, transverse and oblique directions the angle of the cable changes, such an angular change can be followed by the rotation of the spherical guide member, wherefore no excessive load such as a twist is exerted on the cable. Further, only by the supporting device, displacements in vertical and transverse directions can be coped with despite their magnitudes and angular changes of the cable in oblique directions can be coped with.

DETAILED DESCRIPTION OF THE PREFERRED EMBODIMENTS

FIGS. 1 to 5 show a first embodiment of the present invention, and a cable supporting device 10 (hereinafter, referred to as a "supporting device 10") is for supporting a cable 20 arranged to span between an automotive vehicle body (not shown) and a slide door (not shown) slidably connected to the vehicle body by allowing the cable to be inserted therethrough.

Figure 1:
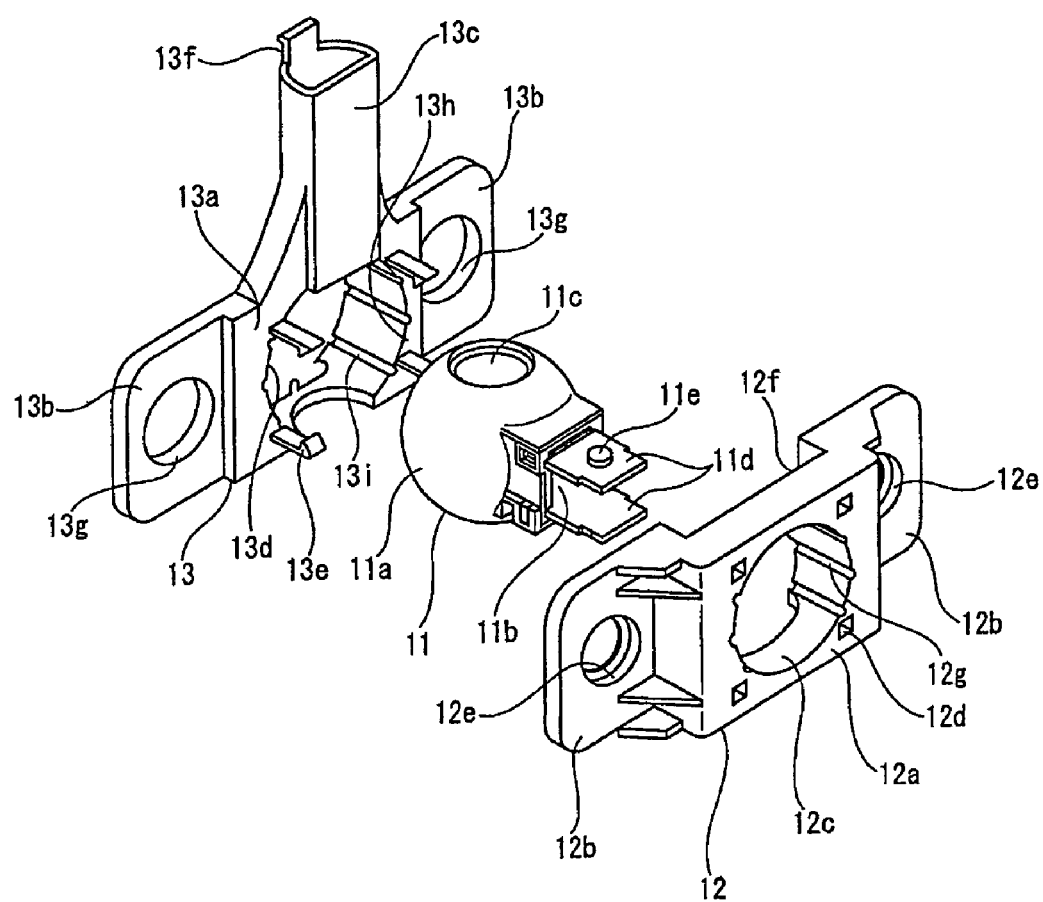
FIG. 1 is an exploded perspective view of a cable supporting device according to a first embodiment of the invention.

As shown in FIG. 1, the supporting device 10 includes a spherical guide member 11 made of resin and a pair of first and second supporting members 12, 13 rotatably holding the spherical guide member 11 therebetween.

The spherical guide member 11 has a spherical frame body 11a, a first opening 11b communicating with a spherical hollow portion S1 of the frame body 11a is formed in one side surface of the frame body 11a, and a second opening 11c communicating with the hollow portion S1 is formed in the upper side spaced apart by 90° from the first opening 11b. The first opening 11b is a rectangular opening, and a pair of connecting pieces 11d project from the opposite upper and lower edges of the first opening 11b and include pin-shaped projections 11e.

On the other hand, the cable 20 is covered by a chained link member 22 in which a multitude of link members are successively rotatably connected. The pair of connecting pieces 11d are placed on and rotatably connected with a leading-end link member 21A of this chained link member 22. Thus, the chained link member 22 is so connected with the spherical guide member 11 as to be able to change its angle in transverse direction (swingable in transverse direction).

The first supporting member 12 for tightly holding the spherical guide member 11 at one side includes a supporting portion 12a in the form of a thick plate for supporting the spherical guide member 11 and vehicle-body fixing portions 12b in the form of thin plates projecting sideways from the opposite left and right sides of the supporting portion 12a, and a fitting recess 12f to be fitted to the second supporting member 13 is formed in the inner surface of the supporting portion 12a. A spherical opening 12c is formed in the center of the supporting portion 12a, and the inner circumferential surface of the spherical opening 12c is formed into a curved surface in conformity with the outer circumferential surface of the spherical guide member 11. Further, a plurality of grooves 12g extending from one end to the other end of the supporting member 12a in thickness direction and adapted to discharge foreign matters are formed in the inner circumferential surface of the spherical opening 12c while being circumferentially spaced apart. Four locking holes 12d used for the connection with the second supporting member 13 are formed around the spherical opening 12c while being circumferential spaced apart. Further, bolt holes 12e are formed in the vehicle-body fixing portions 12b of the first supporting member 12.

The second supporting member 13 for tightly holding the spherical guide member 11 at the other side includes a supporting portion 13a in the form of a thick plate for supporting the spherical guide member 11, vehicle-body fixing portions 13b in the form of thin plates projecting sideways from the opposite left and right sides of the supporting portion 13a, and a tubular portion 13c projecting upward from the upper side of the supporting portion 13a. A spherical opening 13d is formed in the center of the supporting portion 13a, and the inner circumferential surface of the spherical opening 13d is formed into a curved surface in conformity with the outer circumferential surface of the spherical guide member 11. Further, a plurality of grooves 13i extending from one end to the other end of the supporting member 13a in thickness direction and adapted to discharge foreign matters are formed in the inner circumferential surface of the spherical opening 13d while being circumferentially spaced apart. Further, a projection 13h having an arcuately curved surface in conformity with the outer circumferential surface of the spherical guide member 11 projects from the peripheral edge of the spherical opening 13d. This projection 13h is fitted into the fitting recess 12f of the first supporting member. In this state, the vehicle-body fixing portions 13b are held in contact with the vehicle-body fixing portions 12b of the first supporting member 12 and bolt holes 13g formed in the vehicle-body fixing portions 13b communicate with the bolt holes 12e of the vehicle-body fixing portions 12b.

Further, four locking pieces 13e to be inserted into the locking holes 12d of the first supporting member 12 for locking engagement are formed on the supporting portion 13b of the second supporting member 13 while being circumferential spaced apart.

The bottom end of a hollow portion S2 of the tubular portion 13c projecting upward from the supporting portion 13a communicates with the spherical opening 13d, and a fixing piece 13f, to which the cable 20 inserted through the hollow portion S2 is fixed by taping, projects from the upper end of the tubular portion 13c.

Figure 2:
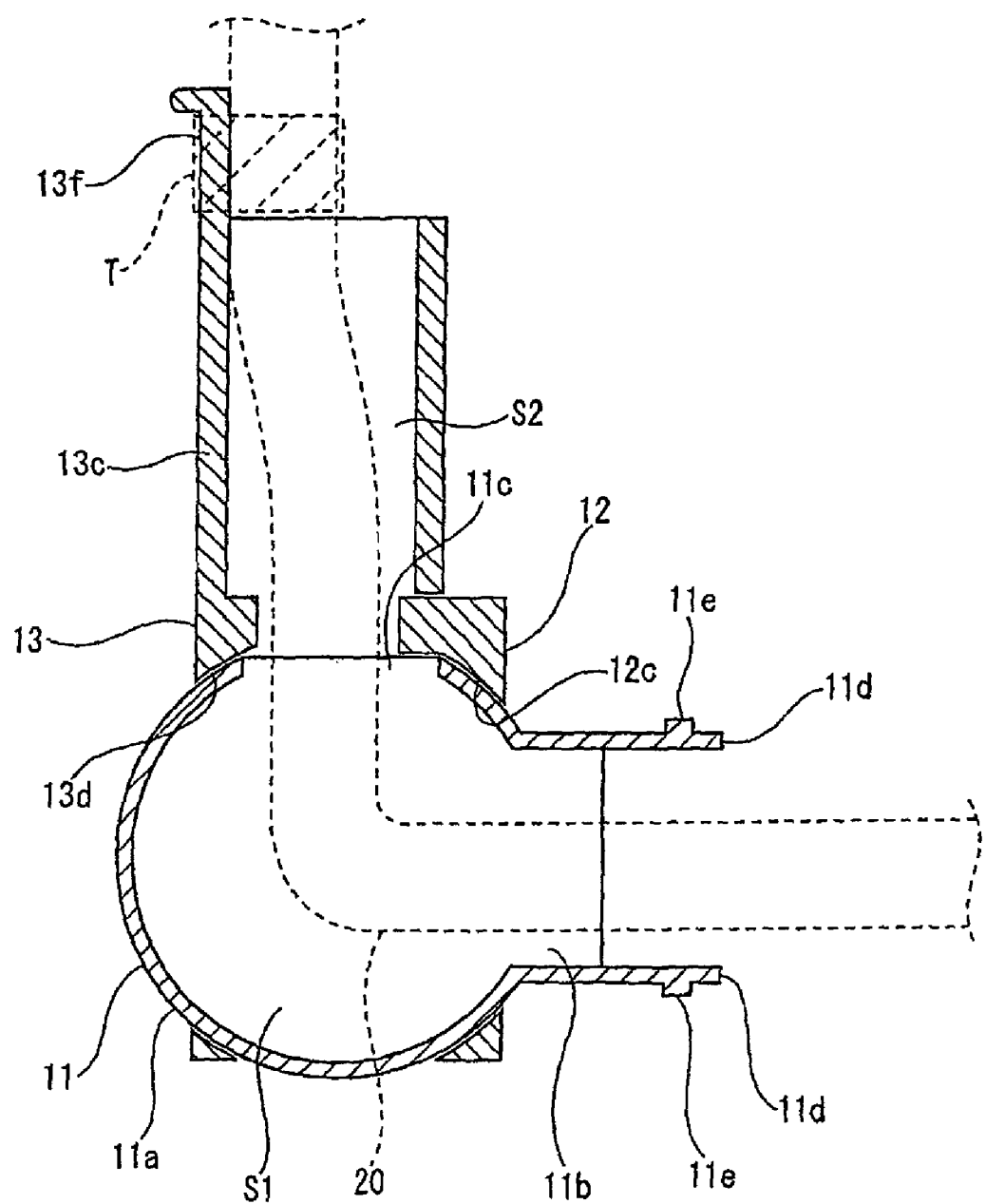
FIG. 2 is a section of the cable supporting device.

With the spherical guide member 11 fitted in the spherical openings 12c, 13c of the first and second supporting members 12, 13, the locking pieces 13e of the second supporting member 13 are inserted into the locking holes 12d of the first supporting member 12 for locking engagement, and the first and second supporting members 12, 13 are connected as shown in FIG. 2, thereby rotatably tightly holding the spherical guide member 11. In this state, the upper and lower connecting pieces 11d of the first opening 11b of the spherical guide member 11 are caused to project from the spherical opening 12c of the first supporting member 12, whereas the second opening 11c communicates with the hollow portion S2 of the tubular portion 13c of the second supporting member 13. Further, the grooves 12g formed in the inner circumferential surface of the spherical opening 12c of the first supporting member 12 and the grooves 13i formed in the inner circumferential surface of the spherical opening 13d of the second supporting member communicate, so that dust, sand, water and the like having entered between the spherical guide member 11 and the spherical openings 12c, 13d can be discharged to the outside through the grooves 12g, 13i.

The cable 20 as a bundle of a plurality of wires arranged between the slide door and the vehicle body is inserted through the supporting device 10 having the spherical guide member 11 and the first and second supporting members 12, 13 assembled as above. In other words, the cable 20 inserted into the hollow portion S1 of the spherical guide member 11 from the first opening 11b is bent at 90° and inserted into the hollow space S2 of the tubular portion 13c through the second opening 11c, and the cable 20 pulled out from the upper end of the tubular portion 13c is fixed to the fixing piece 13f by winding a tape T.

Further, upon being mounted on the vehicle, the supporting device 10 is fixed to a vehicle body panel by inserting unillustrated bolts (fastening members) through the communicating bolt holes 12e, 13g.

The cable 20 pulled out from the tubular portion 13c of the second supporting member 13 of the supporting device 10 is arranged in the vehicle body to be connected with a floor harness (not shown) by means of a connector, whereas the cable 20 inserted into the first opening 11b of the spherical guide member 11 is arranged to span between the vehicle body and the slide door and connected with a door harness (not shown) by means of a connector. In this way, the floor harness and the door harness are electrically connected via the cable 20.

The cable 20 inserted into the first opening 11b is covered by the chained link member 22 in which a plurality of link members 21 are connected. The link members 21 have a rectangular tubular shape. As shown in FIG. 3(B), a round through hole 21a is formed at the front or rear side of each of the upper and lower walls opposed to each other, and a pin-shaped projection 21b is provided on the opposite side thereof. A plurality of link members are so connected with each other as to be rotatable in transverse direction by fitting the pin-shaped projections 21b of one link member 21 into the through holes 21a of the adjacent link member 21. The through holes 21a of the leading-end link member 21A of the chained link member 22 covering the cable 20 are engaged with the pin-shaped projections 11e of the connecting pieces 11d of the spherical guide member 11 to rotatably connect the leading-end link member 21A. By connecting in this way, the chained link member 22 can be bent in transverse direction.

It should be noted that the link members and the leading-end link member and the spherical guide member 11 may be rotatably connected using separate pins.

As described above, according to the present invention, the cable 20 spanning between the vehicle body and the slide door is covered by the chained link member 22, inserted into the first opening 11b of the spherical guide member 11 connected with the leading-end link member of the chained link member at the vehicle body side, brought to the second opening 11c after passing the hollow portion S1 and pulled out through the hollow portion S2 of the tubular portion 13c from the second opening 11c.

Structurally, the chained link member 22 is bendable only in transverse direction, but the spherical guide member 11 is rotatably supported by the first and second supporting members 12, 13 so as to be rotatable in vertical, transverse and oblique directions. Thus, if the angle of the cable 20 inserted through the spherical guide member 11 changes in vertical, transverse or oblique direction, the spherical guide member 11 rotates to follow this angular change, wherefore the angle of the cable 20 smoothly changes.

Figure 3A:
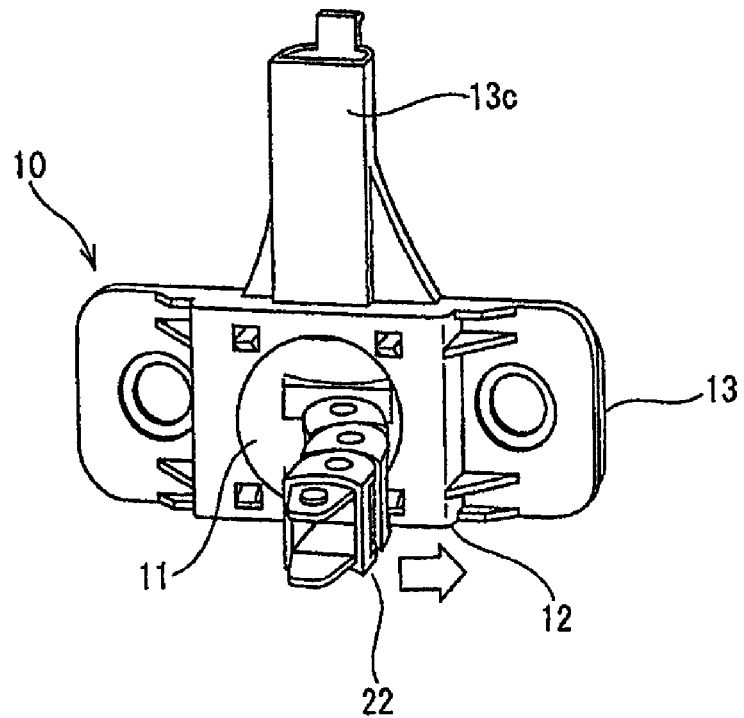
FIGS. 3(A) and 3(B) are diagrams showing a state where a spherical guide member is rotated in transverse direction.
Figure 3B:
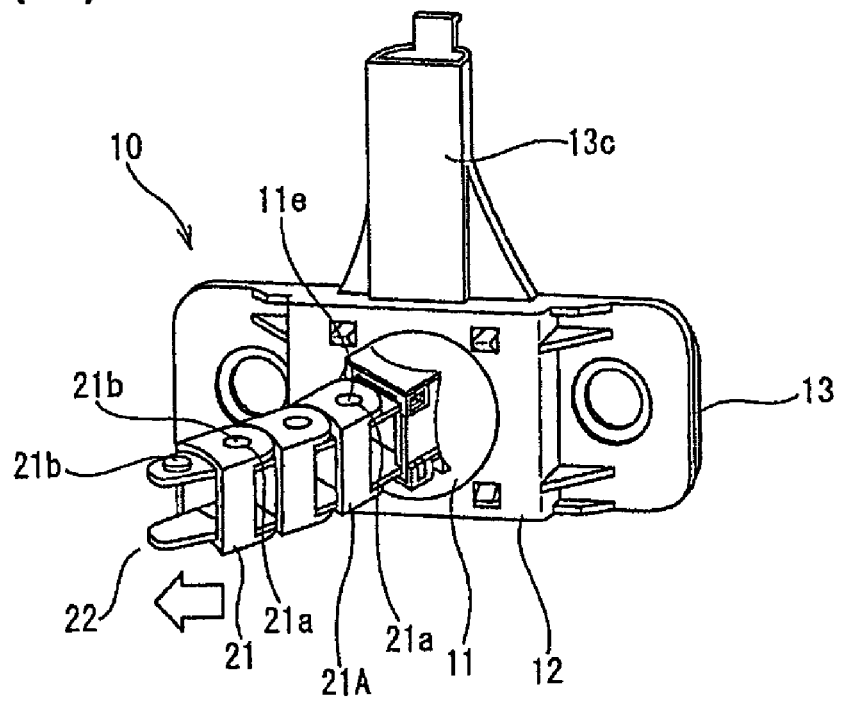

For example, if the slide door is moved in transverse direction and the cable 20 is displaced also in transverse direction, the spherical guide member 11 rotates in transverse direction in the first and second supporting members 12, 13 as shown in FIG. 3, whereby the angle changes in transverse direction over a wider range as compared to the transverse angular displacement only by the chained link member 22 to follow the angular change of the cable 20 in transverse direction.

Figure 4A:
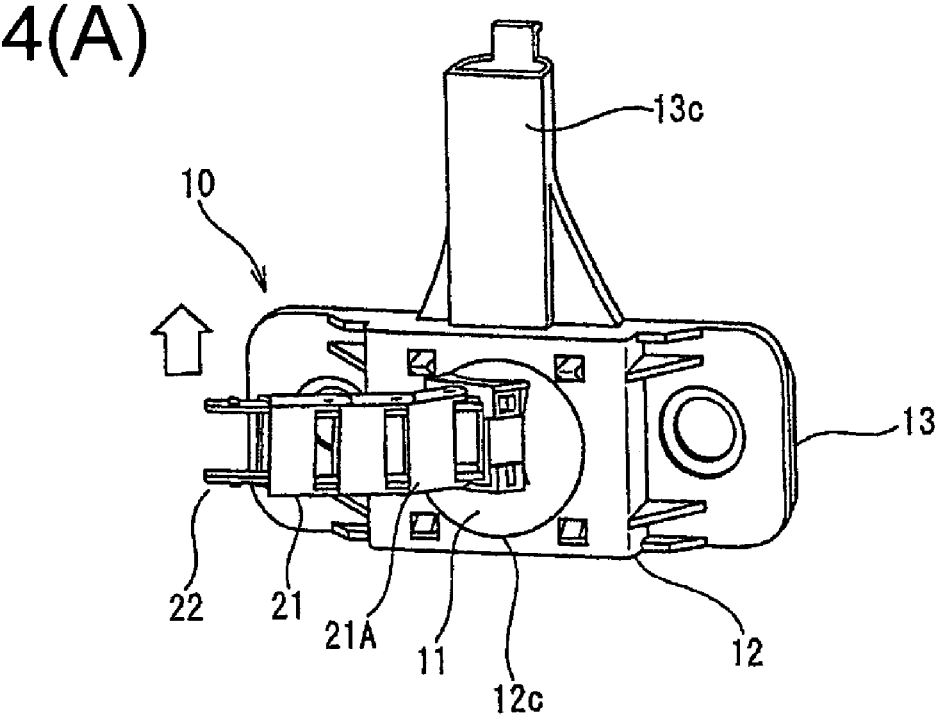
FIGS. 4(A) and 4(B) are diagrams showing a state where the spherical guide member is rotated in transverse direction.
Figure 4B:
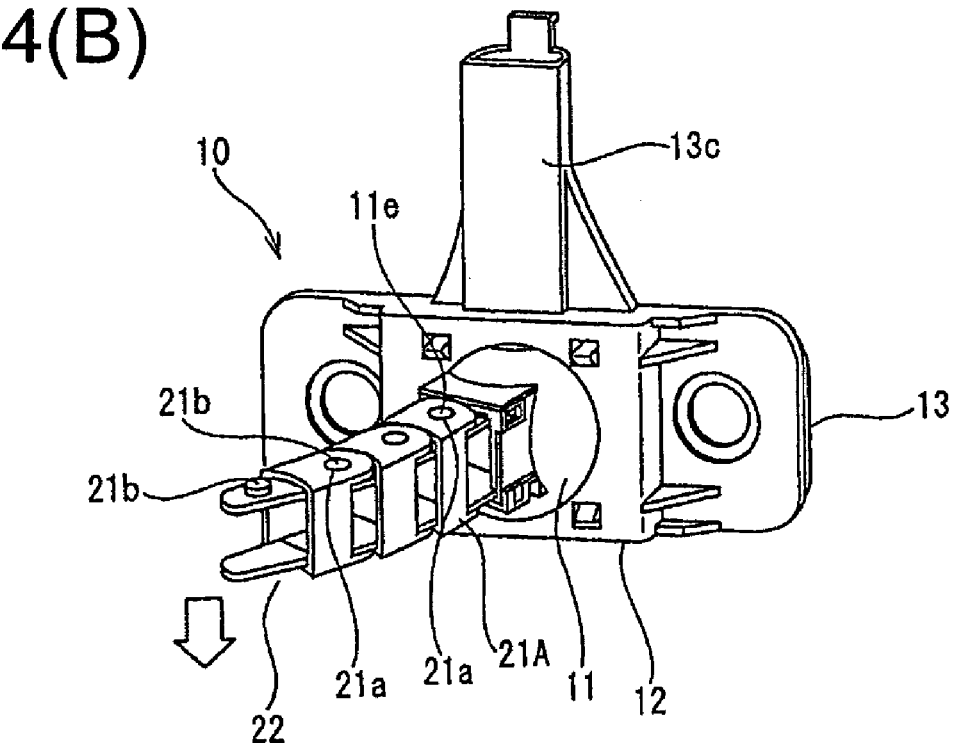

Further, if the slide door is moved in vertical direction and the cable 20 is displaced also in vertical direction, the spherical guide member 11 rotates in vertical direction in the first and second supporting members 12, 13 as shown in FIG. 4, whereby a vertical angular change, which is impossible in the chained link member 22, is caused to follow a vertical displacement of the cable.

Figure 5:
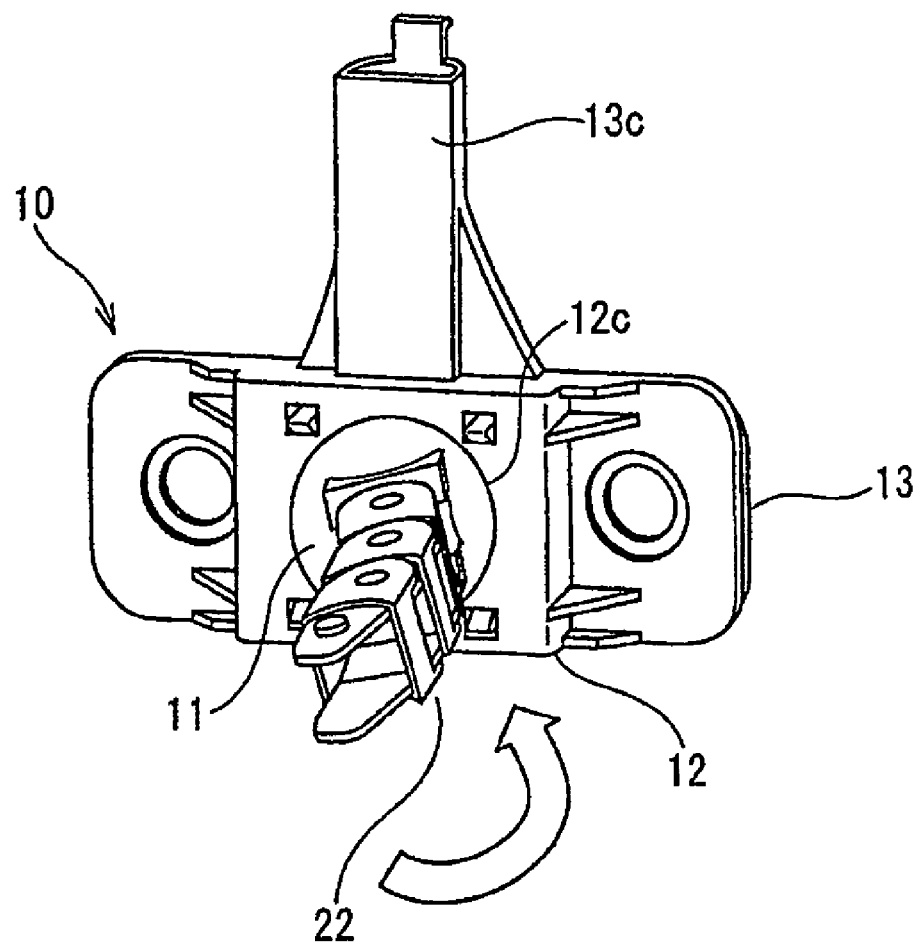
FIG. 5 is a diagram showing a state where the spherical guide member is rotated in circumferential direction.

Furthermore, if the slide door is inclined during its sliding movement and the angle of inclination of the cable 20 is also changed, the spherical guide member 11 rotates in circumferential direction in the first and second supporting members 12, 13 with respect to the spherical opening 12c as shown in FIG. 5, whereby the angle of the chained link member 22 changes to follow the angular displacement of the cable 20 in an oblique direction.

As described above, in the supporting device 10 of the present invention, the angular changes of the cable in vertical, transverse and oblique directions can be followed by the rotation of the spherical guide member 11 and the amount of displacement of the cable is large. Therefore, this supporting device 10 can be used for other types of vehicles.

Further, since the connecting mode of the link members of the chained link member and that of the leading-end link member and the first supporting member of the supporting device are the same, the leading-end link member can have the same shape as the other link members, wherefore the number of parts can be reduced and the leading-end link member and the supporting member can be easily connected.

Although the supporting device 10 is fixed to the vehicle body in this embodiment, it may be provided on the slide door depending on the vehicle type or may be provided on both the vehicle body and the slide door. If the supporting device 10 is provided on both the vehicle body and the slide door, the movable range of the cable can be widened.

Figure 6:
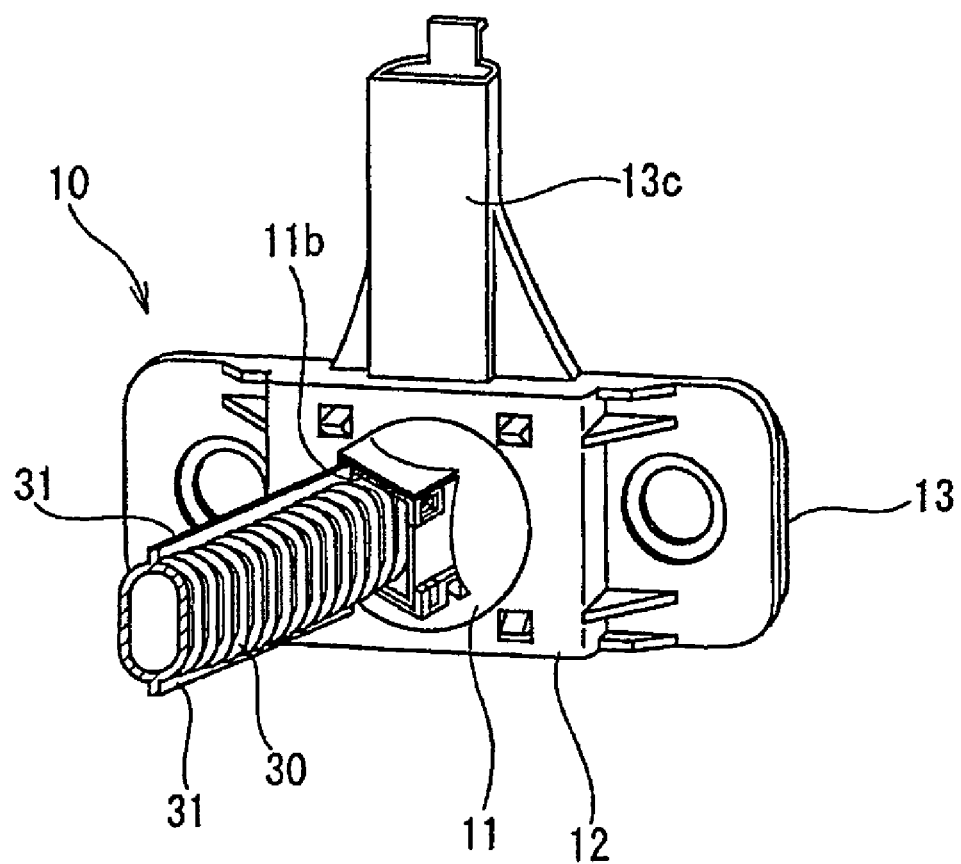
FIG. 6 is a perspective view of a supporting device according to a second embodiment.
Figure 7A:
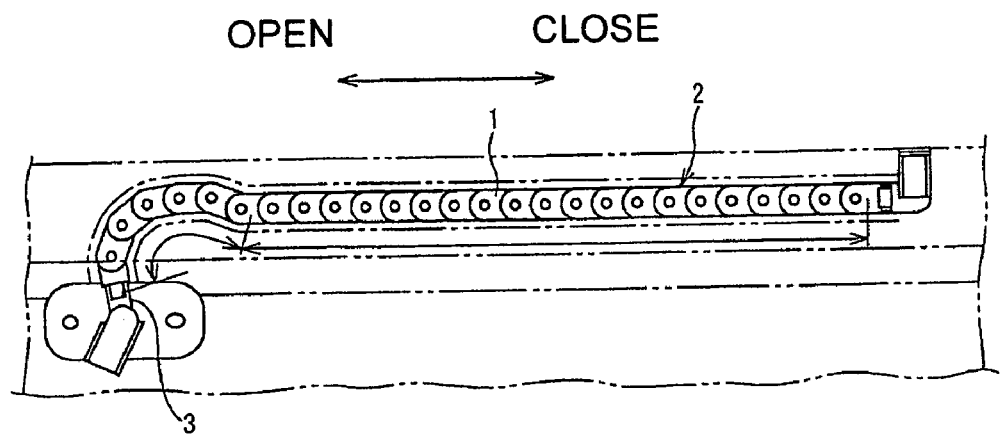
FIGS. 7(A) and 7(B) are diagrams showing a prior art device.
Figure 7B:
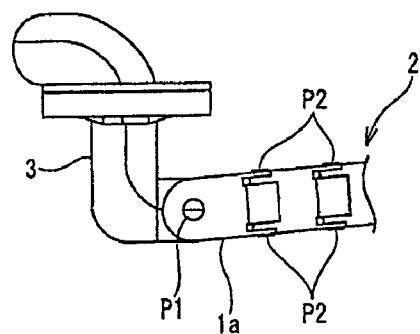

FIG. 6 shows a second embodiment of the present invention.

In this embodiment, the covering member covering the cable drawn out from the spherical guide member 11 of the supporting device 10 differs from that of the first embodiment. Specifically, in this embodiment, a corrugate tube 30, in which projected portions and recessed portions are alternately arranged in longitudinal direction, is mounted instead of the chained link member, and an end of the corrugate tube 30 toward the spherical guide member 11 is fitted and fixed in the first opening 11b of the spherical guide member 11. The corrugate tube 30 has an oblong cross-sectional shape along a direction normal to the longitudinal direction thereof, wherein the major axis direction of the corrugate tube 30 is a vertical direction and the minor axis direction thereof is a horizontal direction. Further, ribs 31 extending in longitudinal direction are provided at the opposite upper and lower ends of the outer circumferential surface of the corrugate tube 30, thereby making the corrugate tube 30 difficult to vertically bend and easy to transversely bend for the restriction of the bending direction.

The cross-sectional shape of the corrugate tube along the direction normal to longitudinal direction is not limited to the oblong shape, and may be an elliptical shape or a rectangular shape. If the bending direction can be restricted by the cross-sectional shape of the corrugate tube, it is not necessary to provide the ribs on the outer circumferential surface.

The cable is not shown in FIG. 6.

According to the above construction, the bending direction of the corrugate tube 30 is restricted to transverse direction, wherefore the cable can be bent in vertical direction and oblique direction by the rotation of the spherical guide member 11 while being prevented from hanging down.

The invention claimed is:

1. A cable supporting device for supporting a cable arranged between a vehicle body and a movable member movably connected to the vehicle body, comprising:
   a guide member including a frame body having a three dimensional outer arcuate surface and a hollow interior portion, first and second openings formed in the frame body and communicating with the hollow interior portion of the frame body, the first and second openings being substantially orthogonal to one another and used for insertion of the cable,
   a supporting member for rotatably tightly holding the outer arcuate surface of the guide member and
   a covering member defined by a chained link member or a corrugate tube covering the cable, the covering member being connected to the first opening so as to be rotatable within a specified angular range,
   wherein the cable extending from a leading end of the covering member is inserted from the first opening of the guide member to the second opening through the hollow portion so that the guide member can follow angular changes of the cable in vertical, transverse and oblique directions.

2. The cable supporting device of claim 1, wherein a supporting surface of the supporting member for rotatably supporting the arcuate surface of the guide member is formed with grooves for discharging foreign matters accumulating between the first and second supporting members.

3. The cable supporting device of claim 1, wherein:
   the cable is arranged between the vehicle body and a slide door,
   the supporting member for rotatably tightly holding the guide member is fixed to the vehicle body and/or the slide door, and
   the guide member rotates to follow angular changes of the cable as the slide door is opened and closed.

4. The cable supporting device of claim 3, wherein the vehicle fixing portions of the first and second support members are formed with bolt holes for attachment to the vehicle body and slide door.

5. A cable supporting device for supporting a cable arranged between a vehicle body and a movable member movably connected to the vehicle body, comprising:
   a guide member including a frame body having a three dimensional outer arcuate surface and a hollow interior portion, first and second openings formed in the frame body and communicating with the hollow interior portion of the frame body,
   a supporting member fixed to the vehicle body or the movable member, wherein
   the supporting member includes a first supporting member and a second supporting member for rotatably supporting the outer arcuate surface of the guide member, the first and second supporting members being formed with openings,
   the first opening of the guide member is formed in one side surface, and two connecting pieces project from opposite edges of the first opening of the guide member, the connecting pieces project from the opening of the first supporting member and are rotatably connected with a leading-end link of a chained link member covering the cable, so that the leading-end link is connected rotatably in a transverse direction and adjacent links of the chained link member successively connected with the leading-end link are also connected rotatably in the transverse direction,
   whereas the second opening of the guide member is formed at an upper side spaced apart by about 90° from the first opening, and the cable inserted from the first opening is pulled out from the second opening after being bent by about 90° in the hollow interior portion of the guide member, so that the guide member rotates in vertical, transverse or oblique directions to follow the angular change of the cable in vertical, transverse or oblique directions.

6. The cable supporting device of claim 5, wherein the cable is fixed to the second supporting member by providing the second supporting member with a tubular portion communicating with the second opening of the spherical guide member and projecting upward, and providing a fixing piece for the cable projecting from the upper end of the tubular portion.

7. The cable supporting device of claim 6, wherein:

a plurality of locking pieces project from one of the first and second supporting members while being spaced apart, whereas locking holes engageable with the locking pieces are formed in the other of the first and second supporting members, and the first and second supporting members are connected with the guide member surrounded and are held by the locking pieces.

8. The cable supporting device of claim 5, wherein the connecting pieces are connected to the leading-end link member by a pin-shaped projection.

* * * * *